United States Patent [19]
Weisbecker

[11] 3,881,183
[45] Apr. 29, 1975

[54] READ/WRITE CIRCUITS FOR RELIABLE DIGITAL RECORDING

[75] Inventor: Joseph A. Weisbecker, Cherry Hill, N.J.

[73] Assignee: RCA Corporation, New York, N.Y.

[22] Filed: Oct. 25, 1973

[21] Appl. No.: 409,614

[52] U.S. Cl. .................. 360/40; 360/43
[51] Int. Cl. .................. G11b 5/09
[58] Field of Search .................. 360/43, 40

[56] References Cited
UNITED STATES PATENTS

| | | | |
|---|---|---|---|
| 3,303,486 | 2/1967 | Young | 360/40 |
| 3,573,766 | 4/1971 | Perkins, Jr. | 360/40 |
| 3,732,364 | 5/1973 | Teradz | 360/40 |

*Primary Examiner*—Vincent P. Canney
*Attorney, Agent, or Firm*—Edward J. Norton; Carl M. Wright

[57] ABSTRACT

Circuit for reading and writing different numbers of pulses to represent binary ones and zeros. One or more pulses can be picked up or dropped without affecting the validity of the information.

6 Claims, 3 Drawing Figures

READ/WRITE CIRCUITS FOR RELIABLE DIGITAL RECORDING

BACKGROUND OF THE INVENTION

Magnetic tapes are used by computer and minicomputer systems for storage of large amounts of data. The disadvantage of tape systems is the relatively long access times, but the quantity of information that can be stored at a moderate price usually outweighs the disadvantage. Disc storage systems reduce the access time but with a reduction in storage capacity. Drum storage systems reduce the access times even more but also with a further concomitant reduction in capacity.

The drive hardware for magnetic tape stations is designed to minimize delays due to starting the tape from rest. As a result, safeguards for preventing the breaking, jamming, or skewing of tape must be included in the machine. This causes the tape drive mechanism to be expensive.

The information is written to and read from the tape at the highest rate possible commensurate with reliability. The speed of information transfer is a function of the tape speed and packing density. Typical packing densities are 500 to 800 bits per inch and some high density tapes double that density.

With high density recordings, minute flaws in the oxide coating of the tape will cause errors. Some errors can be prevented by redundant or error correcting coding schemes, but these techniques reduce the information transfer rate and increase the complexity of the associated circuits. High reliability tapes are specially manufactured for such uses and often must be certified to meet the requirements of machine manufacturers and users; this increases their cost.

The net result of the above constraints is an expensive tape device. Some applications, however, do not require the high degree of sophistication of high-speed, high-density tape stations. Small minicomputers or microcomputers are used in applications requiring more modest transfer rates which do not justify the expense of the high priced tape drives. For marketing reasons, however, few or no low-speed, low-density, low-cost tape drives are available for digital recording.

Commercially available audio tape recorders have a low price but are subject to several problems that limit their usefulness as digital recorders.

Only one track at a time can be written or read on monaural recorders so that a self-clocking code must be used. A stereo recorder can be used with one channel providing a timing signal. This, however, reduces its storage capacity.

Speed variations make the use of the usual self-clocking codes such as phase encoding (Manchester code), NRZ (None Return to Zero), and NRZI (Inverted) unreliable.

Frequency Shift Keying can be used on an audio tape. That is, a binary one is stored as several cycles of one frequency and a binary zero, as several cycles of another frequency. Speed variations will change the frequency by an amount proportional to twice the speed variations. The read and write circuits must be made more complex to detect and to decode the frequencies.

It is desirable to have a recording scheme which is self-clocking, reliable with varying speeds, simple to implement, and which can tolerate a nominal amount of noise.

BRIEF DESCRIPTION OF THE INVENTION

Serial pulses are generated at a given frequency and applied to a recorder through a gate. The gate is controlled by a counter which counts the number of pulses written and controls the number of pulses written according to the value of a data bit being written.

DETAILED DESCRIPTION OF THE INVENTION

Figure 1:
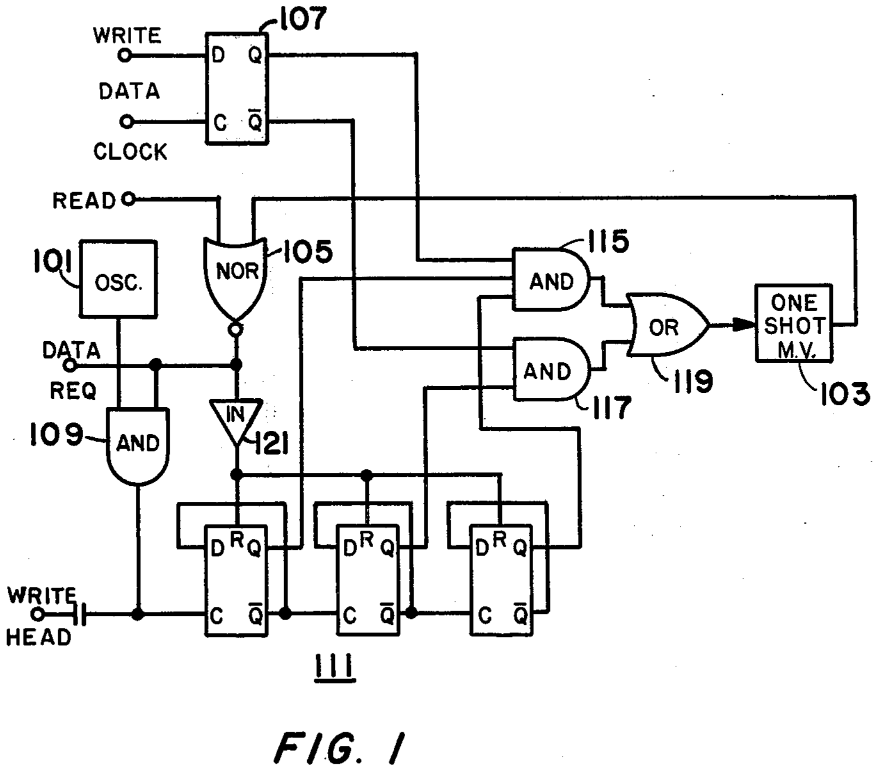
FIG. 1 is a logic diagram of an embodiment of the invention for recording information.

When recording binary information using different numbers of cycles to represent zeros and ones, a compromise must be made between speed and reliability. The fewer cycles used to represent a bit, the faster the speed (data rate) will be. The more cycles used per bit, the more reliable the information transfer will be.

If $m$ cycles represent a binary one and $n$ cycles represent a binary zero, the difference, $|m-n|$ represents a guard number. The guard number can be chosen to distinguish the value of a bit when cycles have been picked up or dropped during reading or writing.

Letting $b$ represent a buffer number and $g$, the guard number, $(g-b)/2$ cycles can be dropped from the greater of $m$ and $n$, and the same number added to the smaller, without invalidating the information.

Assuming for purposes of illustration that $m$ is greater than $n$ — it will be clear that $m$ and $n$ can be freely interchanged — then a binary one will be the detection of a number of cycles equal to or greater than $m-(g-b)/2$ and a binary zero, by the detection of number of cycles less than or equal to $n+(g-b)/2$. Since $g$ is $m-n$, the number of cycles that will be detected as a binary one is $(m+n+b)/2$ and, as a binary zero, $(m+n-b)/2$.

The values of $m$, $n$, and $b$ can be determined by the speed desired, the probability of picking up or dropping a cycle during a read or write, and prevention of ambiguity.

In the illustrated embodiment, $m$ is 5, $n$ is 2, and $b$ is 1. Four or more cycles will be read as a binary one; three or fewer cycles will be read as a binary zero.

The time separating adjacent bits must be selected to account for speed variations in the tape travel and for the frequency at which the information is written.

If the maximum speed variation of the tape travel is represented by $\Delta v$, the permissible variation in the separation interval, or gap, time will be proportional to 2 $\Delta v$. That is, $\Delta t_g = 2k\Delta v$ where $t_g$ is gap time and $k$, a proportionally constant which can be shown to be $t_g/(v+\Delta v)$.

Accounting for twice the speed variation can be visualized qualitatively by assuming a gap is written when the tape speed is a minimum, i.e., $v-\Delta v$, and is read when the tape speed is at a maximum, i.e., $v+\Delta v$.

Gap time must be proportional to the frequency of recording so that a maximum variation in tape speed between cycles of a bit is not detected as a gap. The effect of the drop-out of one or more successive cycles must also be minimized by the selection of gap time.

If $n$ is three and the drop-out of the second bit is detected as a gap, a zero will be read incorrectly as two successive zeros. In the illustrated embodiment where $m$=5 and $(g-b)/2 = 1$, $t_g$ must be greater than $3/f$, where $f$ is the frequency of the cycles. (In general, $t_g>(g-b+1)/f$.) The illustrated embodiment records at a frequency of 4 kHz. Since $1/f$ is 0.25 milliseconds, a gap time of one millisecond ($t_g>3/f$) can be used.

The value of $\Delta t$ from above is 180 microseconds if the maximum variation in tape speed is ±10%. (If tape speed variation is given as a percentage, i.e., 100($\Delta v/v$), then $\Delta t = 2t_g u/(1+u)$, where $u$ is $\Delta v/v$.

Making the gap time too long reduces the transfer rate unnecessarily.

In the embodiment of a write circuit shown in FIG. 1, the frequency of the oscillator 101 will, for purposes of illustration, be 4 kHz. Most low cost audio tape systems exhibit good response around that frequency.

A one-shot multivibrator 103 produces an output signal of logical one for a period of 1 millisecond when activated by an input signal of logical one.

A NOR gate 105 produces an output signal of logical zero when either or both input signals are a logical one. One input signal is the output signal of the one-shot multivibrator 103. The other input signal to the NOR gate 105 is a command signal from a controller (not shown) that is a logical one when data is to be read and a logical zero when data is to be written.

A data flip-flop 107 is set when a logical one is to be written and reset when a logical zero is to be written. The flip-flop 107 is shown as a D-type flip-flop which is set by a clock pulse of logical one when the D (data) input signal is a logical one and which is reset by a clock pulse of logical one when the D input signal is a logical zero. When the clock pulse is a logical zero, the flip-flop cannot change state. The data and clock input signals are provided by the controller, which need not be explained in detail for an understanding of the invention.

The output signal from the oscillator 101 is the input signal to an AND gate 109, the other input signal of which is the output signal of the NOR gate 105. The AND gate 109 produces an output signal of logical one only when both input signals are logical ones; otherwise, its output signal is a logical zero.

The output pulses from the AND gate 109 are recorded on the tape, preferably through a DC-blocking capacitor.

The output signal of the AND gate 109 is also coupled to the input stage of a three-stage binary counter 111, which is implemented with D-type flip-flops with the reset output coupled back to the D input terminals. Each clock pulse applied to a stage causes that stage to change state. The clock pulse for each succeeding stage is provided by the reset output signal from the preceding stage. Each stage changes state at half the frequency of the preceding stage, forming a binary counter.

The set output signals from the first and third stages of the binary counter 111 are coupled as two input signals of a three-input AND gate 115, the third input signal of which is the set output signal from the data flip-flop 107.

The set output signal from the second stage of the binary counter 111 is coupled as an input signal to an AND gate 117, the other input signal of which is the reset output signal from the data flip-flop 107.

The output signal from either the AND gate 115 or the AND gate 117 activates the one-shot multivibrator 103 via an OR gate 119.

The output signal of the NOR gate 105 transmits a data request signal to the controller to initiate the transfer into the data flip-flop 107 of the next bit to be written.

The logical zero output signal of the NOR gate 105 is inverted to a logical one by an inverter 121 to reset all stages of the binary counter 111.

When data is to be written, the data bit is stored in the flip-flop 107 and the read signal is a logical zero. The one-shot multivibrator 103 has not been activated so its output signal is initially a binary zero.

The binary zero input signals to the NOR gate 105 produce a binary one output signal, removing the reset signal from the binary counter 111 and activating the AND gate 109 so that it passes the 4 kHz output pulses from the oscillator 101.

The number of pulses written to the tape is counted by the binary counter 111. If a binary zero is being recorded, a count of two in the binary counter 111 will activate the AND gate 117. If a binary one is being recorded, a count of five will activate the AND gate 115.

The output signal of the OR gate 119 will be, therefore, a logical one when the proper number of cycles have been written according to the data, i.e., five cycles for binary one and two cycles for binary zero.

The logical one output signal from the OR gate 119 will activate the one-shot multivibrator 103, the logical one output signal of which will cause the output signal of the NOR gate 105 to change to a logical zero.

The logical zero output signal from the NOR gate 105 will cause the controller to set the flip-flop 107 to the value of the next bit to be written, will inhibit the AND gate 109 so that no more cycles are written to the tape nor counted in the binary counter for approximately 1 millisecond, and will reset the binary counter 111 to zero via the inverter 121.

When the output signal of the one-shot multivibrator 103 returns to logical zero after approximately 1 millisecond, the next bit will be written as described above.

Figure 2:
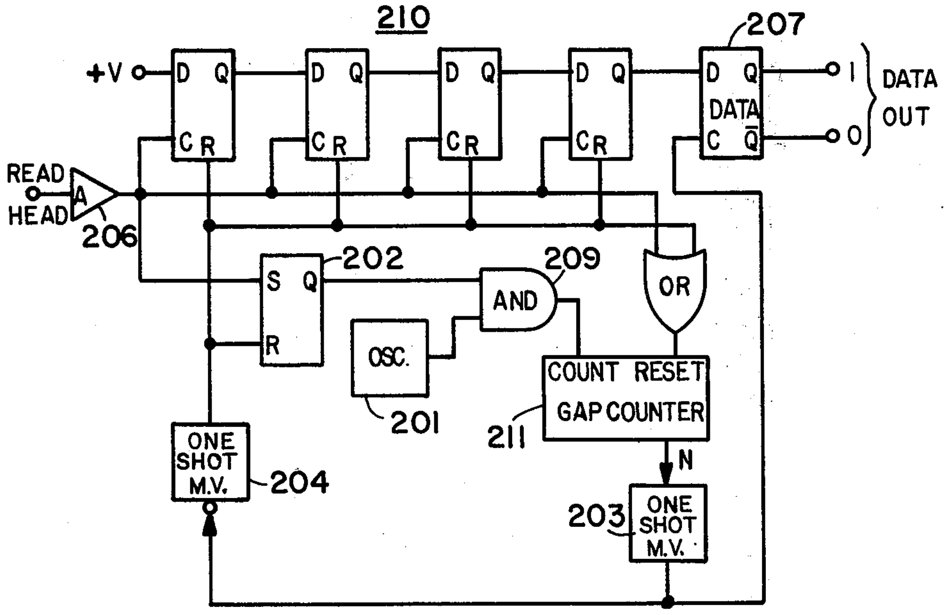
FIG. 2 is a logic diagram of an embodiment of the invention for reading information.

The circuit shown in FIG. 2 is used to read the information recorded by the above-described circuits.

An amplifier 206 shapes the signals read from the tape into pulses of logical ones and zeros. The output signal of the amplifier 206 sets a flip-flop 202, resets a gap counter 211 to zero, and provides shift pulses to a four-stage shift register 210.

The set output signal of the flip-flop 202 enables an AND gate 209 to pass the output pulses of an oscillator 201. The output pulses from the AND gate 209 are counted by the gap counter 211, which can be implemented in a manner similar to the binary counter 111 of FIG. 1.

When N output pulses have been counted by the gap counter 211, a one-shot multivibrator 203 is activated. The value of N depends on the frequency of the oscillator 201. If the frequency of the oscillator is 4 kHz, then, for an N of five, a gap will be detected having a minimum duration of one millisecond.

The logical one output signal of the one-shot multivibrator 203, the duration of which can be very short, clocks the bit in the last stage of the shift register 210 into a data flip-flop 207. When the output signal of the one-shot multivibrator 203 goes to logical zero, another short-duration one-shot multivibrator 204 is activated to reset the flip-flop 202, the shift register 210, and the gap counter 211.

The shift register 210 is coupled so as to shift a logical one into the first stage with each shift pulse. Therefore, when each pulse is read from the tape, a logical one is shifted into the first stage of the shift register 210 and the gap counter 211 is reset. If the cycle is the first after a gap, the flip-flop 202 is set, which causes the gap counter 211 to count the number of oscillator pulses. If less than N are counted before the succeeding cycle is read, the counter is reset to zero.

Subsequent cycles shift the logical one from the first stage into the second stage and so on if a gap has not been detected between cycles.

When a gap is detected, the bit in the last stage of the shift register 210 is the data bit and is clocked into the flip-flop 207 for utilization by the controller. A data ready signal can be supplied to the controller by the N output signal of the gap counter 211 or the output signal of either one-shot multivibrator 203 or 204.

If three or fewer cycles are read between gaps, the information is a data bit with a value of zero since the last stage in the shift register 210 will not be set.

If four or more cycles are read between gaps, the information is a data bit with a value of one since the last stage in the shift register 210 will be set.

If a tape recorder is to be used for both reading and writing (but not at the same time), it would be more economical to combine the various parts of the circuits shown in FIGS. 1 and 2 that perform the same functions. An example of such a circuit is shown in FIG. 3.

Figure 3:
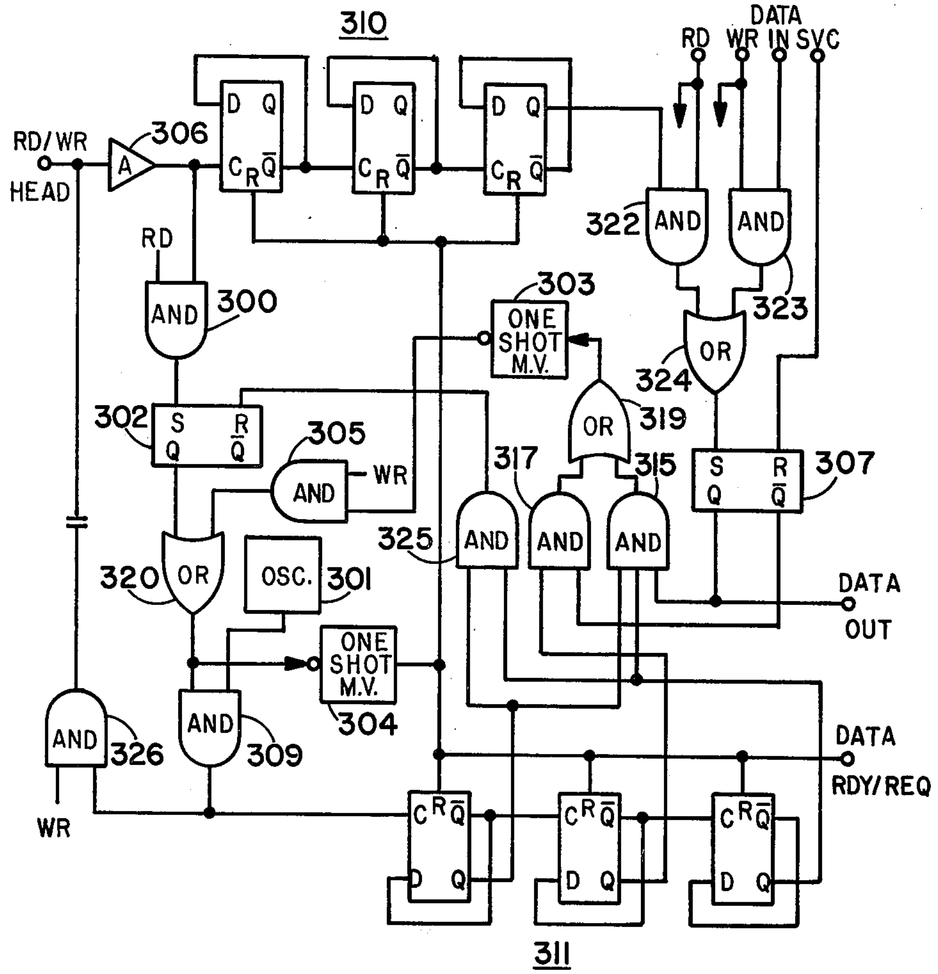
FIG. 3 is a logic diagram of a circuit combining the read and write circuits.

The shift register 210 shown in FIG. 2 is replaced by a binary counter 310 in the circuit in FIG. 3. When data is read, the signals are shaped by the amplifier 306 and counted by the binary counter 310. The read (RD) signal from the controller and the first pulse read after a gap set a flip-flop 302 via an AND gate 300.

Setting the flip-flop 302 enables the output pulses from a 4 kHz oscillator 301 to be counted by a binary counter 311 via an OR gate 320 and an AND gate 309.

When the binary counter 310 counts four input pulses, a data flip-flop 307 is set through an AND gate 322 and an OR gate 324 by the set output signal from the last stage of the binary counter 310.

The binary counter 311 will contain a value of five when a gap is detected, which will reset the flip-flop 302 via an AND gate 325. The output signal of the OR gate 320 then changes to a logical zero value, activating a one-shot multivibrator 304, which produces an output signal to reset both binary counters 310 and 311 and to furnish a signal to the controller that the data bit is ready. When the controller has accepted the data out signal, it generates a service (SVC) signal to reset the data flip-flop 307.

When a write operation is performed, the data in signal is used to set the data flip-flop 307 via an AND gate 323 and the OR gate 324. The data in signal is preceded by a SVC signal to reset the data flip-flop 307.

The output pulses from the oscillator 301 are gated via the AND gate 309 which is enabled by the OR gate 320 in turn activated by an AND gate 305.

The pulses are written to the tape through an AND gate 326 and are counted by the binary counter 311. When the value in the counter 311 corresponds to the number of cycles to be written according to the data, i.e., five for binary one and two for binary zero, either an AND gate 315 or an AND gate 317 will activate the one-shot multivibrator 303 via an OR gate 319.

The output of the one-shot multivibrator 303 will inhibit the AND gate 305 for approximately 1 millisecond to generate a gap. The output signal of the OR gate 320 changing to a logical zero will activate the short-duration one-shot multivibrator 304 to reset the counters and generate a data request signal to the controller.

Although the invention was described above as applying to tape recorders, it can be used on other mediums such as disc, drums, and so on. Fixed routines for small machines might be pressed on records and read by use of an inexpensive phonograph.

Various modifications can be made by those of ordinary skill in the art to the invention as described within the scope of the following claims.

What is claimed is:

1. The combination comprising:
- means for producing a data bit to be written;
- means for producing serial pulses at a certain frequency;
- gating means for applying said serial pulses to a recording device;
- counter means responsive to the gating means for producing output signals indicative of the number of pulses applied to the recording device; and
- means responsive to the output signals of the counter means and the data bit for controlling said gating means.

2. The invention as claimed in claim 1 wherein said gate controlling means includes:
- first decoding means responsive to one value of the data bit and output signals from said counter indicative of a certain number of pulses for producing an output signal;
- second decoding means responsive to the other value of the data bit and output signals from said counter indicative of a different number of pulses for producing an output signal; and
- means responsive to the output signals from said first and second decoding means for producing a signal to inhibit the gating means during a certain period of time.

3. The invention as claimed in claim 3 further including means for combining the signal from the inhibiting means and a control signal to inhibit the gating means.

4. The combination comprising:
- reading means for producing an output signal indicative of stored information;
- shift register means responsive to the output signal from said reading means for shifting a bit from stage to stage;
- control means for producing an output signal after a predetermined time interval between successive output signals from the reading means; and
- means responsive to the output signal of said control means for producing a data bit signal corresponding to the state of the last stage in said shift register means.

5. The invention as claimed in claim 4 including:
- means responsive to the output signal from said control means for resetting said shift register means and said control means.

6. The invention as claimed in claim 4 wherein said control means includes:
- means for producing serial pulses;
- counter means for producing an output signal in response to a given number of input signals;
- gating means for applying the serial pulses as input signals to said counter means; and
- means responsive to the output signal of the reading means for controlling the gating means.

* * * * *